J. GODDARD.
VIEW FINDER FOR PHOTOGRAPHIC CAMERAS.
APPLICATION FILED SEPT. 22, 1919.
1,392,759.
Patented Oct. 4, 1921.
2 SHEETS—SHEET 1.
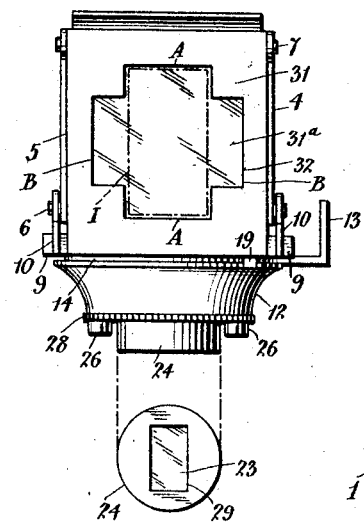
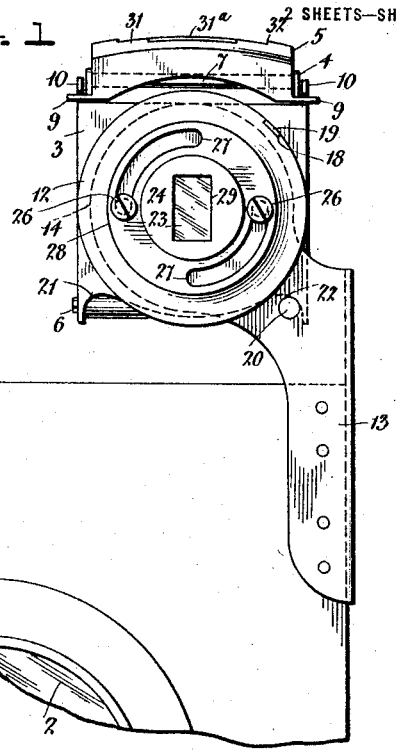
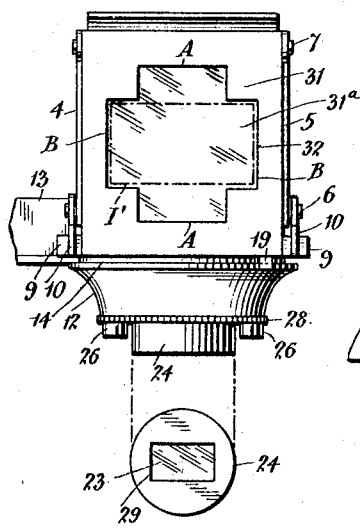
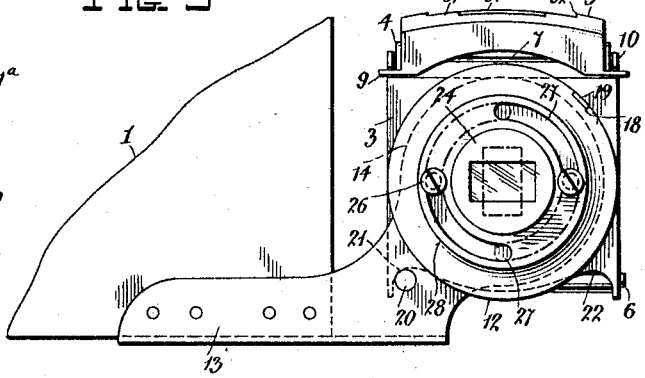
Witnesses
Inventor
Joseph Goddard,
by
Attorney J. GODDARD.
VIEW FINDER FOR PHOTOGRAPHIC CAMERAS.
APPLICATION FILED SEPT. 22, 1919.
1,392,759.
Patented Oct. 4, 1921.
2 SHEETS—SHEET 2.
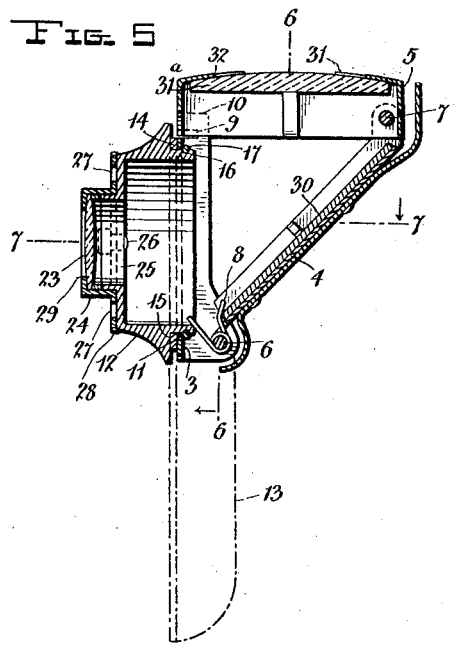
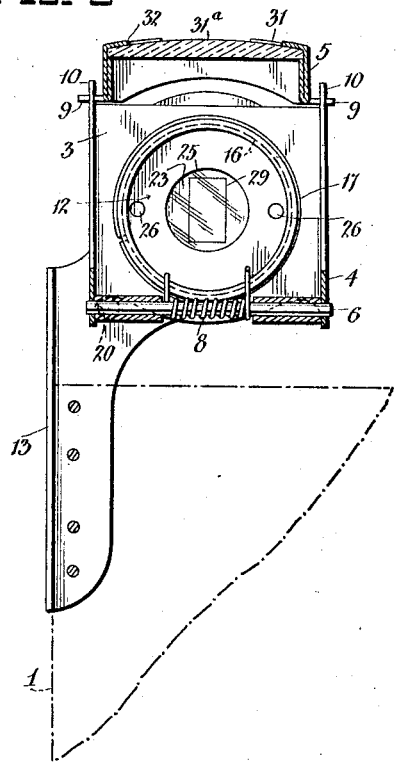
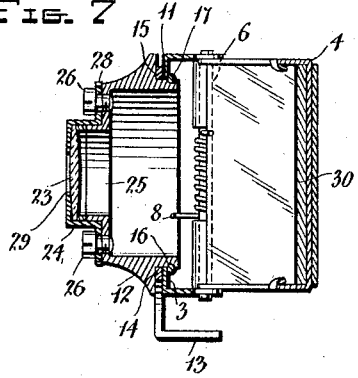
Witnesses
Inventor
Joseph Goddard,
by
Attorney.

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

VIEW-FINDER FOR PHOTOGRAPHIC CAMERAS.

1,392,759.   Specification of Letters Patent.   Patented Oct. 4, 1921.

Application filed September 22, 1919. Serial No. 325,325.

*To all whom it may concern:*

Be it known that I, JOSEPH GODDARD, a citizen of the United States, residing at Rochester, in the county of Monroe and State of New York, have invented new and useful Improvements in View-Finders for Photographic Cameras, of which the following is a specification.

My present invention relates to improvements in view finders for photographic cameras and more especially to those of the type adapted to be held in either of two positions for the taking of pictures of oblong form with the longer dimension of the picture arranged either vertically or horizontally. The primary object of the invention is to provide a novel and improved view finder which will correctly and completely outline, in form and position, the field of the picture to be taken upon the film or other sensitized medium, whether the camera is held in a position for taking the picture with its longer dimension vertical or horizontal, thus enabling the user or operator of the camera to obtain, with certainty, pictures which include the desired portions of the views. Another object of the invention is to provide a view finder, the optical system of which is so constructed and arranged that the view finder will serve as a level to indicate the correct position in which the camera should be held to insure that the optical axis of the camera lens will be horizontal and that the longer dimension of the picture will occupy a true horizontal or vertical position according to the position in which the camera is held.

To these and other ends, the invention consists in certain improvements and combinations and arrangements of parts all as will be hereinafter more fully described, the features of novelty being pointed out particularly in the claims at the end of the specification.

In the accompanying drawings:—

Figure 1 is a front elevation of a portion of the lens front of a photographic camera equipped with a view finder constructed in accordance with the present invention, the camera and view finder being set for the taking of pictures with the longer dimension thereof vertical.

Fig. 2 is a top plan view of the view finder as shown in Fig. 1.

Fig. 3 is a view similar to Fig. 1, the camera and view finder being set for taking pictures with the longer dimension thereof horizontal.

Fig. 4 is a top plan view of the view finder as shown in Fig. 3.

Fig. 5 represents a central vertical section through the view finder, the section being in the plane of the optical axis of the view finder.

Fig. 6 represents a section on the line 6—6, Fig. 5.

Fig. 7 represents a section on the line 7—7, Fig. 5.

Similar parts are designated by the same reference characters in the several views.

View finders embodying the present invention are applicable to photographic cameras of the various well known types, the embodiment of the invention shown in the present instance being particularly applicable to photographic cameras of the so-called folding type in which the view finder is mounted on the lens front, the lens front being connected by a collapsible bellows to the body of the camera. The preferred embodiment of the invention is shown in the present instance and will be hereinafter described in detail. It is to be understood, however, that the invention is not restricted to the precise construction shown, as equivalent constructions are contemplated and will be included within the scope of the claims.

In the present instance 1 represents a portion of the lens front of a camera of the so-called folding type, the lens front being fitted with and carrying a lens 2 through which exposure of the film or sensitized medium contained within the camera is effected. The view finder as shown is mounted on the lens front, the optical axis of its objective lens being arranged in parallelism with the optical axis of the camera lens 2. The view finder as shown comprises a front member or plate 3, an inclined rear member 4, and a top member 5. These members comprising the casing of the view finder may, in some instances, be connected rigidly, but in the present instance the view finder is adapted particularly for use in connection with folding cameras and hence the view finder casing is foldable or collapsible. To this end the rear member 4 of the finder casing is pivotally connected at its lower edge by a pintle 6 to the lower portion of the front member 3, and the rear portion of the top member 5 is pivotally connected by the pintle 7 to the upper portion of the rear member 4. A spring 8 acts with a tendency to swing the member 4 of the finder casing rearwardly, thus opening the finder casing to bring the members composing it into proper operative relation. The rearward movement of the member 4 and also the top member 5 under the influence of the spring 8 is limited by ears 9 on the top member 5 which engage upstanding lugs 10 on the front member 3, these ears and lugs serving to retain the members 4 and 5 of the finder casing in correct relation to the front member 3 as shown in Fig. 5. When the camera is folded the rear member 4 of the finder casing may swing forwardly into a position immediately behind the front member 3. The front member 3 of the finder casing is formed with a circular opening 11 into which is fitted a lens tube 12. This lens tube preferably serves as a pivot or axis about which the finder casing may rotate relatively to the lens front of the camera. In the construction shown, a bracket 13, which is fixed to the lens front 1 and which serves to support the view finder thereon, is formed with an annular portion 14 which rotatably fits over or around the lens tube 12 and abuts against the forward side of the front member 3 of the finder casing. The lens tube 12 is formed with a shoulder 15 which abuts against the forward side of this ring-like portion 14 of the bracket and means is provided for imposing a suitable degree of friction between this ring-like portion 14 of the bracket and the finder casing in order that the latter, after it has been manually set in the desired position, will remain in such position until shifted manually to a different position. Preferably and as shown, the necessary degree of friction is obtained by providing the rear portion of the lens tube 12 with an exterior circumferential groove 16 and springing a resilient split ring 17 into the groove, the groove being so located that the ring 17 will bear against the rear face of the front member 3 of the finder casing, the ring thus serving to hold the lens tube in its proper position in the finder casing as well as to produce the desired degree of friction between the ring-like bracket and the finder casing and lens tube 12. In order to prevent rotation of the lens tube relatively to the finder casing, or, in other words, to insure a fixed relation between the finder casing and the lens tube, the shoulder 15 of the lens tube is formed with a notch 18 and a locking tongue or projection 19, which is struck up from or otherwise formed on the front member 3 of the finder casing, engages in this notch 18, thus preventing relative rotation between the lens tube and the finder casing. The relative rotation between the finder casing and the bracket 13 is limited to a quarter turn by a pin 20 on the bracket 13 which is arranged to coöperate with either of the stops 21 or 22 formed on the lower edge of the front member 3 of the finder casing. The lens tube 12 contains an objective lens 23, the optical axis of which is parallel with the optical axis of the camera lens 2 and a field defining device is arranged adjacent to this objective lens. In the construction shown, the objective lens 23 is fitted in a head or member 24 which is rotatable on a reduced tubular extension 25 of the lens tube, the rotation of the head 24 relative to the lens tube being limited to a quarter turn by screws or projections 26 which operate in segmental slots 27 formed in the head 24. The peripheral edge 28 of the head is preferably milled to facilitate manual rotation thereof. The field defining device in the present instance is in the form of a mask which is obtained by providing the front of the head 24 with a rectangular opening or aperture 29 which corresponds in its dimensions to those of the picture to be taken by the camera. A reflector 30, preferably in the form of a polished metal mirror, is fixed to the forward or upper side of the rear member 4 of the finder casing, this mirror being preferably located at an angle of 45° to the optical axis of the objective lens, and the top member 5 of the finder casing carries a screen or other medium 31 by which the image projected by the objective lens onto the mirror 30 may be observed by the eye. Preferably a convex or magnifying lens is used as shown.

The view finder as thus far described may be used effectively as a means for determining the objects which will be included within the picture which it is desired to take, whether the camera is held so as to take the pictures with the longer dimension thereof vertical or horizontal. The present invention, however, provides means whereby the view finder will serve as a level so that the operator or user of the camera may hold the camera in a level position in the taking of pictures. This is accomplished by providing a mask or diaphragm 31 adjacent to the screen or observation lens 31ª, the mask in the present instance overlying the observation lens. This mask or diaphragm 31 is provided with an aperture 32 in the approximate form of a Maltese cross, it representing the composite figure produced by interposing the two fields of the images visible on the lens or screen 31ª when the view finder is set for taking pictures with the longer dimension thereof vertical or horizontal, respectively.

The view finder herein described is used as follows. When the camera is held in upright position for the taking of pictures with the longer dimension thereof vertical, as shown in Figs. 1 and 2, the lens front 1 of the camera is upright and the view finder occupies a position in which the observation screen or lens 31ª faces upwardly. The head 24 at the front of the view finder is also set in the position shown in Fig. 1, its oblong aperture 29 occupying a position with its longer dimension vertical. With the view finder set as described, the image I, which is visible through or on the screen 31ª, will occupy the position shown in Fig. 2 relatively to the aperture in the mask 31 and by manipulating the camera, the ends of the elongated image can be caused to fit properly into the opposed recesses A of the mask 31, and when this occurs the camera will occupy a level position. When the camera is to be used in taking pictures, the longer dimension of which is horizontal, the camera is held with the lens front 1 in horizontal position, the view finder casing is rotated through a quarter turn to bring the observation screen or lens 31ª uppermost, and the head 24 is rotated through a quarter turn to bring its aperture 29 horizontal, as shown in Fig. 3. The image I' visible on or through the observation screen or lens 31 will extend transversely across the aperture 32 in this screen and by tilting the camera, the ends of the image may be caused to fit properly into the recesses B of the aperture 32 and when this occurs the camera will occupy a level position. In resetting the camera and view finder for the taking of pictures, the longer dimension of which is vertical, the lens front 1 is brought to an upright position; then the finder casing is rotated through a quarter turn to bring the observation screen or lens 31ª uppermost, and the head 24 is rotated through a quarter turn to bring its aperture 29 vertical as shown in Fig. 1.

What is claimed is:—

1. A view finder for photographic cameras comprising an objective lens, a reflector and an image screen to receive an image from said reflector, means for mounting the finder on a camera whereby the reflector and screen may be rotated into different positions about an axis parallel to the optical axis of the objective lens, and a device rotatable relatively to the reflector and screen and also rotatable relatively to the finder mounting means and located adjacently to the objective lens for delimiting and positioning the field projected by the objective lens and reflector onto the screen.

2. A view finder for photographic cameras comprising a casing carrying an objective lens, a reflector and an image screen, a support adapted to be attached to the camera and on which the finder casing is rotatable, and means located adjacent to the objective lens and rotatable relatively to the finder casing and also rotatable relatively to said support, for outlining and positioning the image projected by the objective lens onto the screen according to the position into which said means is rotated relatively to said support and the finder casing.

3. A view finder for photographic cameras comprising an objective lens, an image screen, and an interposed angular reflector, a support adapted to be fixed to the camera and on which the reflector and screen are rotatable about the optical axis of the objective lens, and a device having an aperture conforming in shape with that of the picture to be taken by the camera, said device being located adjacent to and in alinement with the objective lens and rotatable relatively to said support.

4. A view finder for photographic cameras comprising a finder casing carrying a lens tube containing an objective lens, an image screen and an interposed angular reflector, a support adapted to be attached to a camera, the finder casing being rotatable on said support about said lens tube as an axis, and a head rotatably mounted on said lens tube and carrying a mask located adjacent to said lens for outlining and positioning the image projected by said lens onto said screen according to the position into which said mask is rotated relatively to said support.

5. A view finder for photographic cameras comprising a finder casing having a lens tube non-rotatably fixed thereon and carrying an objective lens, an image-defining screen and an interposed angular reflector, a support adapted to be attached to a camera and on which the lens tube and the finder casing are rotatable about the axis of the lens tube as a center, and a head rotatably mounted on the forward end of the lens tube and carrying a mask the aperture of which conforms in shape with that of the picture to be taken by the camera.

6. A view finder for photographic cameras comprising a finder casing which carries an image screen, a reflector, a lens tube non-rotatably fitted into the front wall of the casing and having a shoulder, a support having a portion lying between said shoulder of the lens tube and the front wall of the finder casing, and a ring fitted to the lens tube and bearing against the rear side of the front wall of the casing to retain the lens tube in position and to produce a frictional engagement between the shoulder of the lens tube and the front wall of the finder casing and the interposed portion of the support.

7. A view finder for photographic cameras comprising a support adapted to be fixed to a camera, an objective lens mounted on said support, an image screen, an angular reflector interposed between said lens and screen, a field-defining device located adjacent to and in fixed relation with said screen, and a coöperating field-defining device located adjacent to said objective lens and rotatable relatively to said support about the optical axis of said lens.

8. A view finder for photographic cameras comprising a support adapted to be fixed to a camera, an objective lens mounted on said support, a reflector and image screen rotatable about the axis of said lens, an image defining device located adjacent to said objective lens and relatively rotatable with respect to said support and screen, and an image positioning device located adjacent to said screen.

9. A view finder for photographic cameras comprising a support adapted to be fixed to a camera, an objective lens mounted on said support, a reflector and image screen rotatable about the axis of said lens, an image defining device located adjacent to said lens and relatively rotatable with respect to the support and the screen, said device having an aperture corresponding in shape to that of the picture to be taken by the camera, and a mask located adjacent to the screen and having an aperture the shape of which corresponds to the image when reflected in two different positions onto the screen.

In testimony whereof I have hereunto set my hand in presence of two subscribing witnesses.

JOSEPH GODDARD.

Witnesses:
CLARA KLEINFELDT,
ANGELA M. BUSH.